United States Patent [19]

Nishida et al.

[11] 4,245,591
[45] Jan. 20, 1981

[54] IGNITION TIMING CONTROL SYSTEM FOR INTERNAL COMBUSTION ENGINES

[75] Inventors: Minoru Nishida; Tadashi Hattori, both of Okazaki; Hiroaki Yamaguchi, Anjo; Kenji Goto, Susono; Daisaku Sawada, Susono; Takashi Shigematu, Susono, all of Japan

[73] Assignees: Nippon Soken, Inc., Nishio; Toyota Jidosha Kogyo Kabushiki Kaisha, Toyota, both of Japan

[21] Appl. No.: 77,917

[22] Filed: Sep. 24, 1979

[30] Foreign Application Priority Data

Oct. 10, 1978 [JP] Japan .................. 53/124402

[51] Int. Cl.$^3$ ............................................. F02P 5/04
[52] U.S. Cl. .................................... 123/416; 123/418
[58] Field of Search .......... 123/117 D, 117 R, 117 A, 123/148 E, 119 ED

[56] References Cited

U.S. PATENT DOCUMENTS

| | | | |
|---|---|---|---|
| 4,126,112 | 11/1978 | Tershak | 123/148 E |
| 4,138,982 | 2/1979 | Hattori et al. | 123/148 E |
| 4,166,440 | 9/1979 | Helava et al. | 123/117 D |
| 4,175,508 | 11/1979 | Wesenmeyer et al. | 123/117 D |
| 4,190,027 | 2/1980 | Inui et al. | 123/117 D |
| 4,191,144 | 3/1980 | Nohira et al. | 123/117 D |

Primary Examiner—Charles J. Myhre
Assistant Examiner—Raymond A. Nelli
Attorney, Agent, or Firm—Cushman, Darby & Cushman

[57] ABSTRACT

It is discriminated in an ignition timing control system for an internal combustion engine whether the ignition timing arithmetically calculated on the basis of sensed operating conditions of the engine lies within a predetermined range of ignition timing. When the result of discrimination indicates that the calculated ignition timing lies within the predetermined range, ignition occurs at that instant, while when the result of discrimination indicates that the calculated ignition timing does not lie within the predetermined range, the result of calculation is disregarded, and ignition occurs at a predetermined instant.

2 Claims, 8 Drawing Figures

IGNITION TIMING CONTROL SYSTEM FOR INTERNAL COMBUSTION ENGINES

BACKGROUND OF THE INVENTION

This invention relates to an ignition timing control system for an internal combustion engine, which comprises a function for limiting the ignition timing to within a proper range so as to ensure occurrence of ignition at an instant lying within the proper range of ignition timing, thereby preventing mis-ignition or ignition at an excessively advanced or retarded instant tending to result when the means for arithmetically calculating the ignition timing makes miscalculation or when the ignition timing is retarded in a transient condition of engine operation.

Ignition timing control systems of very complex structure capable of more accurate control of ignition timing than hiherto are now demanded to deal with the severe regulations on the engine exhaust gases, and also, to improve the fuel consumption of internal combustion engines. In an effort to meet the above demand, researches and studies are now directed to electronic ignition timing control systems which provide a higher freedom of ignition timing control than the conventional mechanical ignition timing control systems. Among various kinds of electronic ignition timing control systems proposed hitherto, an electronic ignition timing control system of the kind employing a microcomputer or microprocessor capable of arithmetically calculating the ignition timing for the complex control of the ignition timing is proved to be predominant, and reserches and studies are being directed to the production of practically usable model of such an electronic ignition timing control system.

However, various problems remain still to be solved before the electronic ignition timing control system of this kind can be put into practical use. The reliability is the most important problem among them. That is, although the electronic ignition timing control system of the kind employing the microcomputer or microprocessor can attain the desired complex control of the ignition timing in compliance with the operating requirement of the engine, it has such a drawback that mis-ignition tends to occur in a transient condition of engine operation such as an abrupt increase or decrease in the rotational speed of the engine, or ignition tends to occur at an excessively advanced or retarded instant. This is because misreading of input data or miscalculation of input data leads to an erroneous result of arithmetic calculation of ignition timing which will provide an inexactly timed output signal for the control of the primary winding of the ignition coil. Further, various sensors provided for sensing the operating conditions of the engine, for example, an intake manifold vacuum sensor, an intake air flow sensor and others will not be readily responsive to such variables but will respond more or less with a delay time. In such cases, the operability of the engine will be greatly impaired, the catalyst will be deteriorated due to the mis-ignition, and the engine will be forced to stop during running.

SUMMARY OF THE INVENTION

With a view to obviate the problems pointed out above, it is a primary object of the present invention to provide a novel and improved ignition timing control system of electronic type for an internal combustion engine which comprises, besides the conventional means for arithmetically calculating the ignition timing, means of simple construction for continuously checking the ignition timing arithmetically calculated by the ignition timing calculating means so that the instant of ignition can be forcedly limited to within the proper range of ignition timing even when ignition is liable to occur at an instant outside the proper range of ignition timing, and also, even when mis-ignition is liable to occur due to a faulty operation of the ignition system.

According to the ignition timing control system of the present invention, ignition can reliably occur at an instant lying within a predetermined range of ignition timing between a pre-set uppermost instant of ignition advance (a maximum advance) and a pre-set lowermost instant of ignition advance (a minimum advance) even when the result of arithmetic calculation of the ignition timing by the ignition timing calculating means does not lie within this predetermined range. The ignition timing control system according to the present invention is therefore advantageous in that it can highly reliably prevent an excessive advance of the ignition timing as well as an excessive retard of the ignition timing.

DESCRIPTION OF THE PREFERRED EMBODIMENTS

The present invention will now be described in detail with reference to the drawings showing preferred embodiments thereof.

Figure 1:
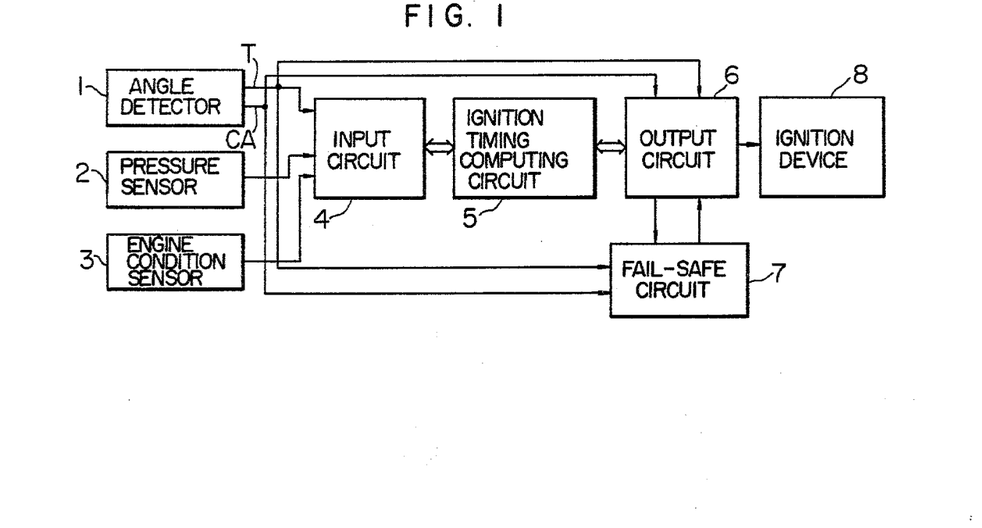
FIG. 1 is a block diagram of a first embodiment of the ignition timing control system according to the present invention.
Figure 3:
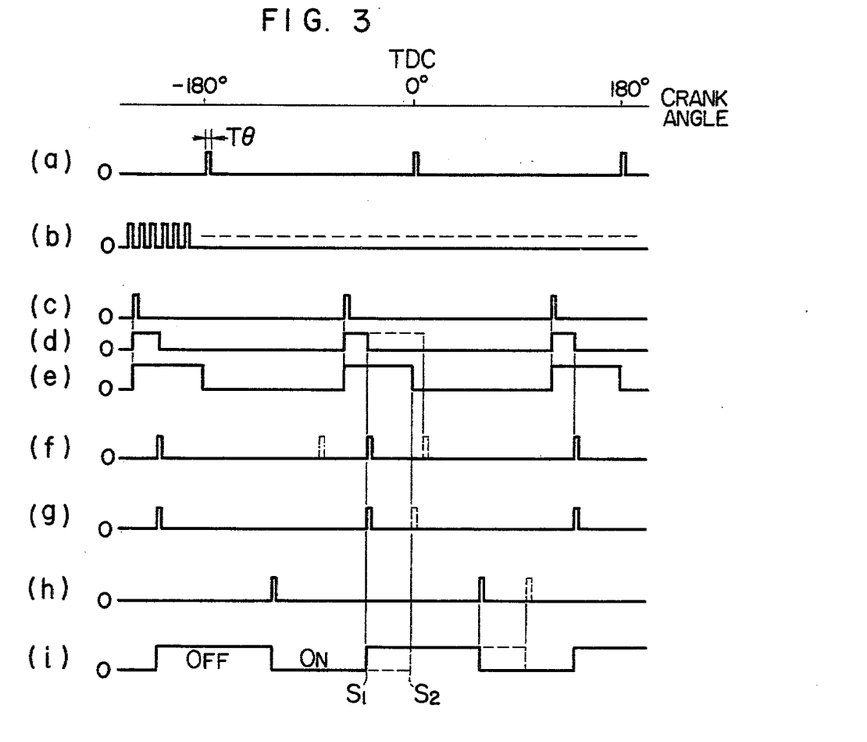
FIG. 3 shows waveforms appearing at various parts of the control system shown in FIG. 1 to illustrate the operation of the control system.

FIG. 1 is a block diagram of a first embodiment of the ignition timing control system according to the present invention. Referring to FIG. 1, an angle detector 1 is mounted on the distributor shaft in a four-cylinder four-stroke cycle internal combustion engine to generate a reference signal T and a crank angle signal CA. The reference signal T is a train of pulses each of which has a constant pulse width $T\theta$ and which appear at a rate of 4 during one complete revolution of the distributor shaft, as shown in FIG. 3(a). The crank angle signal CA is also a train of pulses appearing at a rate of 720 during one complete revolution of the distributor shaft, as shown in FIG. 3(b). A pressure sensor 2 senses the negative pressure or vacuum in the intake manifold of the engine. An engine condition sensor 3 senses one of the operating conditions of the engine, for example, the temperature of engine cooling water, the temperature of ambient atmosphere, the pressure of ambient atmosphere or the rate of exhaust gas recirculation (EGR), except the rotational speed of the engine and the vacuum in the intake manifold.

An input circuit 4 is connected to the angle detector 1, the pressure sensor 2 and the engine condition sensor 3 to convert the angle signal indicative of the rotational speed of the engine, the analog signal indicative of the intake manifold vacuum and the analog signal indicative of one of the engine conditions into corresponding digital signals respectively. An ignition timing computing circuit 5 is connected to the input circuit 4 to act as a means for arithmetically calculating the ignition timing. An output circuit 6 is connected to the ignition timing computing circuit 5 and to the angle detector 1 to generate a train of pulses each of which rises at the arithmetically calculated ignition timing and falls at the timing of starting to supply primary current to an ignition coil in a known ignition device 8 described later. A fail-safe circuit 7 is connected to the output circuit 6 and to the angle detector 1 to act as a means for limiting the ignition timing to within a predetermined range. This fail-safe circuit 7 checks continuously the ignition timing arithmetically calculated by the ignition timing computing circuit 5 to determine that the result of arithmetic calculation by the ignition timing computing circuit 5 represents the proper ignition timing when the result of arithmetic calculation lies within the predetermined range of ignition timing, and a corresponding signal is applied to the output circuit 6. When, on the other hand, the result of arithmetic calculation by the ignition timing computing circuit 5 does not lie within the predetermined range of ignition timing, the fail-safe circuit 7 selects a predetermined setting as the proper ignition timing and applies a corresponding signal to the output circuit 6. In the known ignition device 8 connected to the output circuit 6, current is supplied to the primary winding of the ignition coil at the fall time of the output signal of the output circuit 6, and the current flowing through the primary winding of the ignition coil is interrupted at the rise time of the output signal of the output circuit 6, thereby generating an ignition spark jumping across the spark gap of each individual spark plug.

The ignition timing computing circuit 5 in FIG. 1 is of a known construction comprising a microprocessor (not shown), and the input circuit 4 and the output circuit 6 are connected by bus lines which transient control signals applied from the microprocessor. In response to the application of the data signals indicative of the rotational speed of the engine, the intake manifold vacuum and another specific engine condition from the input circuit 4 by way of the bus lines, the microprocessor in the ignition timing computing circuit 5 arithmetically calculates the ignition timing and applies the data signal indicative of the arithmetically calculated ignition timing to the output circuit 6 by way of the bus line.

Figure 2:
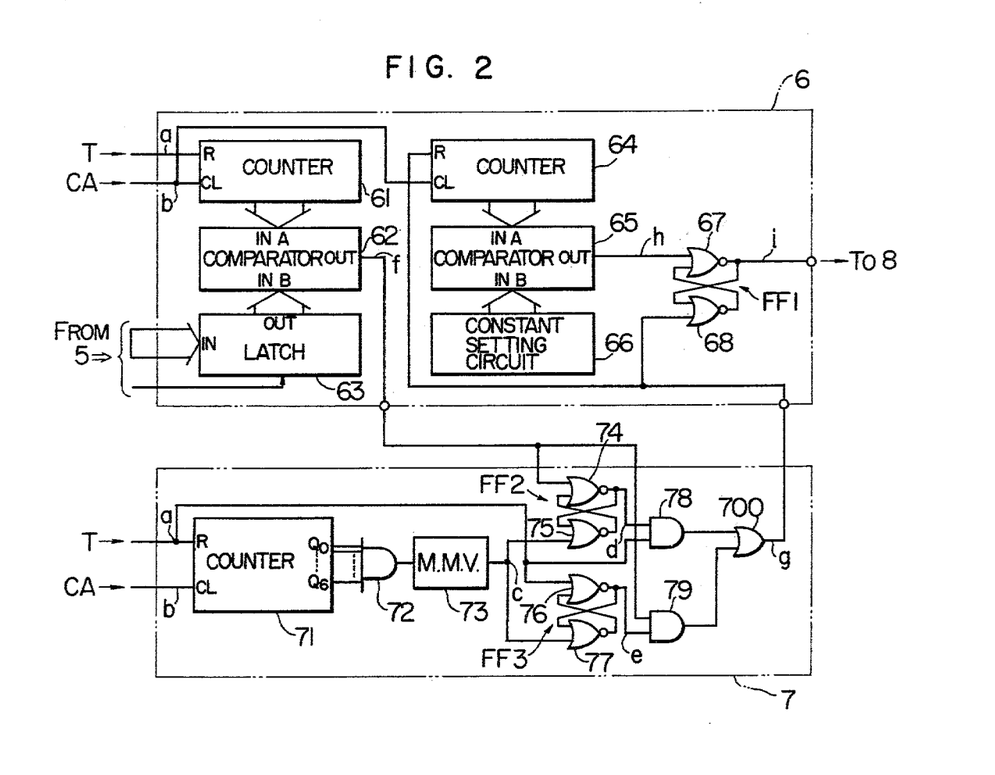
FIG. 2 is an electrical circuit diagram of part of the control system shown in FIG. 1.

The detailed structure of the output circuit 6 and the fail-safe circuit 7 in FIG. 1 will be described with reference to FIG. 2. Referring to FIG. 2, the output circuit 6 comprises a counter 61 receiving the reference signal T and the crank angle signal CA as a reset input and a clock input respectively, a comparator 62, a memory element 63 (which will be referred to hereinafter as a latch and which is, for example, Model CD4042 manufactured by the RCA Corporation) connected to the ignition timing computing circuit 5 for holding the digital data signal indicative of the result of arithmetic calculation, another counter 64 receiving the output signal of the fail-safe circuit 7 and the crank angle signal CA as a reset input and a clock input respectively, another comparator 65, a constant setting circuit 66 for setting the angular range of interruption of current supplied to the ignition coil, and a pair of NOR gates 67 and 68 constituting a flip-flop FF1.

The fail-safe circuit 7 comprises a counter 71 receiving the reference signal T and the crank angle signal CA as a reset input and a clock input respectively, an AND gate 72 having a plurality of input terminals for receiving the output signal portions appearing from a plurality of output terminals $Q_0$ to $Q_6$ respectively of the counter 71, a monostable multivibrator 73 generating a trigger pulse of predetermined pulse width at the rise time of the output signal of the AND gate 72 to establish an uppermost instant of ignition advance or maximum advance, a pair of NOR gates 74 and 75 constituting a flip-flop FF2, another pair of NOR gates 76 and 77 constituting another flip-flop FF3, pair of AND gates 78 and 79, and an OR gate 700.

The operation of the first embodiment of the ignition timing control system according to the present invention will be described with reference to a time chart shown in FIG. 3. As shown in FIG. 3(a), the reference signal T generated by the angle detector 1 is a train of pulses each having a predetermined angular interval $T\theta$, and two consecutive pulses appear during one complete revolution of the crankshaft, with one of the pulses appearing at the top dead center of the piston in each individual cylinder or at the crank angle of 0° and the next appearing at the crank angle of 180°. Also, as shown in FIG. 3(b), the crank angle signal CA generated by the angle detector 1 is a train of pulses each corresponding to 1° of the crank angle.

The pressure sensor 2 is mounted to sense the negative pressure or vacuum in the intake manifold of the engine, and its analog output voltage is variable depending on the negative pressure or vacuum in the intake manifold. The engine condition sensor 3 may be a cooling water temperature sensor of thermistor type or contact type when, for example, the temperature of engine cooling water is sensed for the purpose of ignition timing control. The cooling water temperature sensor 3 generates an analog output signal when it is of the thermistor type and an on-off output signal when it is of the contact type.

The output signals from the angle detector 1, pressure sensor 2 and engine condition sensor 3 are applied to the input circuit 4. In the input circuit 4, the number n of clock pulses of a fixed frequency generated during the predetermined angular interval $T\theta$ of rotation of the engine is counted to provide a digital signal indicative of the count n, and the analog signal indicative of the intake manifold vacuum sensed by the pressure sensor 2 is A-D converted to provide a corresponding digital signal. Also, the analog signal indicative of the specific engine condition sensed by the engine condition sensor 3 is A-D converted into a corresponding digital signal. These digital signals are applied from the input circuit 4 to the microprocessor in the ignition timing computing circuit 5 by way of the individual bus lines. It is apparent that such signals are applied to the ignition timing computing circiut 5 every ignition cycle. Each time these digital signals are applied from the input circuit 4 to the ignition timing computing circuit 5, the microprocessor arithmetically calculates the ignition timing suitable for the sensed operating conditions of the engine, and an output signal indicative of the result of arithmetic calculation is applied from the ignition timing computing circuit 5 to the output circuit 6 by way of the bus line.

Referring to FIG. 2, the signal indicative of the result of arithmetic calculation in the ignition timing computing circuit 5 is applied to the latch 63 which holds the data obtained in each ignition cycle. The reference signal T shown in FIG. 3(a) and the crank angle signal CA shown in FIG. 3(b) are applied to the counter 61. A pulse of the reference signal T resets or clears the counter 61, and then, the counter 61 starts to count pulses of the crank angle signal CA, each of which corresponds to 1° of the crank angle. The output signal of the latch 63 and the output signal of the counter 61 are applied to the comparator 62. When the output signal of the counter 61 representing the count coincides with the output signal of the latch 63 representing the calculated ignition timing data, a pulse as shown in FIG. 3(f) appears at the output of the comparator 62. The rise time of this pulse corresponds to the ignition timing arithmetically calculated in the ignition timing computing circuit 5, and this signal is applied to the fail-safe circuit 7. The reference signal T and the crank angle signal CA are also applied to the counter 71 in the fail-safe circuit 7. A pulse of the reference signal T resets or clears the counter 71, and then, the counter 71 starts to count pulses of the crank angle signal CA. The counter 71, the AND gate 72 and the monostable multivibrator 73 are provided to determine an uppermost instant of ignition advance or maximum advance of the ignition timing, and a pulse as shown in FIG. 3(c) appears at the output of the monostable multivibrator 73.

A pulse as, for example, shown by the broken waveform or one-dot chain waveform in FIG. 3(f) may appear from the comparator 62. Such a pulse does not lie within the range between a pulse of the output signal of the monostable multivibrator 73 establishing the uppermost instant of ignition advance and a pulse of the reference signal T establishing the lowermost instant of ignition advance. It will be seen in FIG. 3(f) that the pulse shown by the broken waveform appears outside the above range. In such a case, a pulse as shown by the broken waveform in FIG. 3(d) appears at the output of the flip-flop FF2 composed of the NOR gates 74 and 75. It will be seen in FIG. 3(d) that this pulse rises at the rise time of the output signal of the monostable multivibrator 73 and falls at the rise time of the output signal of the comparator 62. Since such a pulse is applied to the AND gate 78 to open the same, this AND gate 78 is kept open for that period of time, and the pulse of the reference signal T appears at the output of the AND gate 78 to be applied to the OR gate 700. In the case of the pulse shown by the one-dot chain waveform in FIG. 3(f), no change occurs in the output signal of the flip-flop FF2. In the meantime, a pulse as shown in FIG. 3(e) appears at the output of the flip-flop FF3 composed of the NOR gates 76 and 77. It will be seen in FIG. 3(e) that this pulse rises at the rise time of the output signal of the monostable multivibrator 73 and falls at the rise time of the reference signal T. Therefore, when the output signal of the comparator 62, shown by the broken waveform in FIG. 3(f), appears outside the range between the output signal of the monostable multivibrator 73 shown in FIG. 3(c) and the reference signal T shown in FIG. 3(a), no pulse appears at the output of the AND gate 79. Consequently, the pulse of the reference signal T shown by the broken waveform in FIG. 3(g) appears at the output of the OR gate 700.

When, on the other hand, the output signal of the comparator 62 appears within the range between the output signal of the monostable multivibrator 73 and the reference signal T, as shown by the solid waveform in FIG. 3(f), a pulse as shown by the solid waveform in FIG. 3(d) appears at the output of the NOR gate 74. Therefore, no pulse appears at the output of the AND gate 78, and the output signal of the comparator 62 appears directly at the output of the AND gate 79. Consequently, a pulse as shown by the solid waveform in FIG. 3(g) appears at the output of the OR gate 700 in such a case. Such an output signal of the OR gate 700 is applied to the output circuit 6 again. The counter 64 starts to count pulses of the crank angle signal CA from the fall time of the output signal of the OR gate 700, and when the count attains the numerical value representing the angular range of interruption of current supplied to the ignition coil, which range is pre-set in the constant setting circuit 66, a pulse as shown by the solid waveform in FIG. 3(h) appears at the output of the comparator 64. This output signal of the comparator 65 is applied, together with the aforementioned output signal of the OR gate 700, to the flip-flop FF1 composed of the NOR gates 67 and 68, and a pulse as shown by the solid waveform in FIG. 3(i) appears at the output of the flip-flop FF1. It will be seen in FIG. 3(i) that this pulse rises at the rise time of the output signal of the OR gate 700 and falls at the rise time of the output signal of the comparator 65. This output signal of the flip-flop FF1 is applied to the known ignition device 8. Thus, current starts to flow through the primary winding of the ignition coil at the fall time of the output signal of the NOR gate 67 i.e., the flip-flop FF1 and is interrupted at the rise time of that signal, thereby inducing a high voltage across the secondary winding of the ignition coil for igniting each individual cylinder of the engine.

It will be understood from the above description of the first embodiment of the present invention that the signal representing the result of arithmetic calculation in the ignition timing computing circuit 5 is applied to the output circuit 6, and the ignition timing pulse signal appearing from the output circuit 6 is applied to the fail-safe circuit 7. When the ignition timing pulse appears within the predetermined range, that is, in this embodiment, within the range between the uppermost instant of ignition advance or maximum advance determined by the output signal of the monostable multivibrator 73 and the lowermost instant of ignition advance or minimum advance determined by the reference signal T, ignition occurs at the instant arithmetically calculated by the ignition timing computing circuit 5, that is, at the point $S_1$ shown in FIG. 3(i). When, on the other hand, the ignition timing pulse does not appear within this predetermined range, ignition occurs at the instant determined by the reference signal T, that is, at the point $S_2$ shown in FIG. 3(i), which point indicates the lowermost instant of ignition advance or minimum advance.

In the first embodiment of the present invention described in detail hereinbefore, the uppermost instant of ignition advance is set at the fixed angle before the top dead center of the piston determined by the combination of the counter 71, the AND gate 72 and the monostable multivibrator 73, and the lowermost instant of ignition advance is set at the angle of the top dead center of the piston determined by the reference signal T.

Thus, the range of the ignition timing is maintained constant independently of the operating conditions of the engine. However, the range of the ignition timing may be made variable depending on the operating conditions of the engine. In other words, this range may be narrowed so that ignition can occur at an instant more suitable for the operating conditions of the engine when the result of arithmetic calculation or the calculated instant does not lie within the range of the ignition timing.

Figure 4:
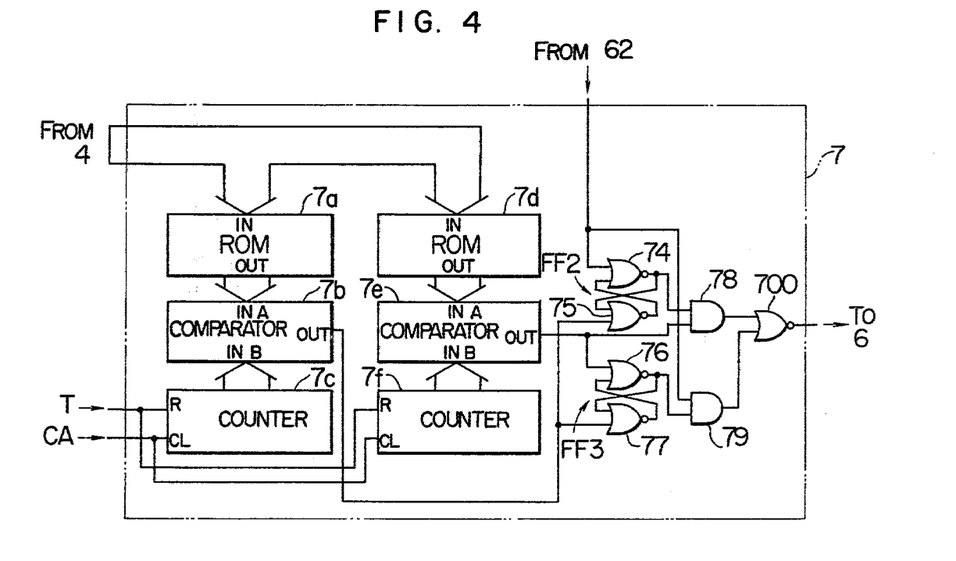
FIG. 4 is an electrical circuit diagram of part of a second embodiment of the present invention.
Figure 5:
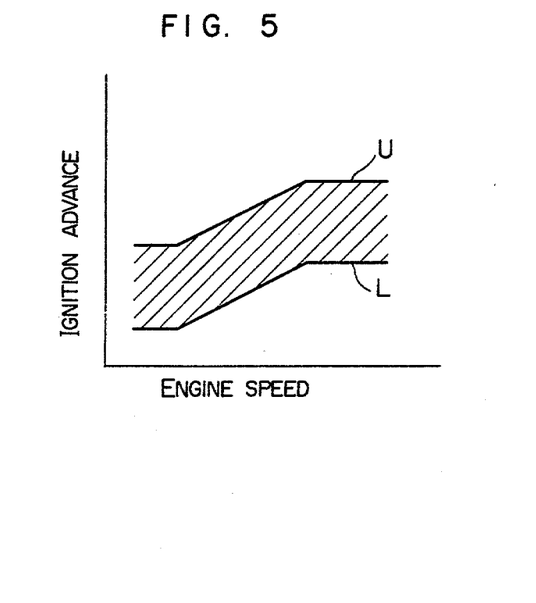
FIG. 5 is a graph showing how the ignition timing is limited to within a predetermined range by the circuit shown in FIG. 4.

FIG. 4 shows a second embodiment of the present invention comprising another form of the fail-safe circuit 7 preferably used to satisfy the above requirement. FIG. 5 shows an uppermost instant U and a lowermost instant L of ignition advance variable depending on the rotational speed of the engine. In FIG. 4, the same reference numerals are used to denote the same or equivalent parts appearing in FIG. 2. Referring to FIG. 4, the fail-safe circuit 7 comprises memory elements (ROM's) 7a and 7d storing pre-set or programmed data of the uppermost and lowermost instants respectively of ignition advance shown in FIG. 5, comparators 7b and 7e, and counters 7c and 7f receiving the reference signal T as its reset input and the crank angle signal CA as its clock input. A data signal indicative of the detected rotational speed of the engine is applied to the ROM's 7a and 7d from the input circuit 4, and data signals indicative of the pre-set uppermost instant U and lowermost instant L of ignition advance corresponding to the detected rotational speed of the engine are applied from the ROM's 7a and 7d to the comparators 7b and 7e respectively. The counters 7c and 7f start to count pulses of the crank angle signal CA after they are reset or cleared by a pulse of the reference signal T, and output pulse signals appear from the comparators 7b and 7e when their counts coincide with the data read out from the ROM's 7a and 7d respectively. The output signal of the comparator 7b represents the uppermost instant U shown in FIG. 5, and the output signal of the comparator 7e represents the lowermost instant L shown in FIG. 5. Therefore, the range of the ignition timing is given by the hatched zone shown in FIG. 5, and ignition occurs at the lowermost instant of ignition advance when the result of arithmetic calculation in the ignition timing computing circuit 5, that is, the calculated instant of ignition does not lie within this zone.

In the aforementioned first embodiment of the present invention, the ignition timing and the timing of starting to supply current to the primary winding of the ignition coil are determined by counting the number n of pulses of the crank angle signal CA generated from the angle detector 1. It is, however, also possible that the rotational speed of the engine is detected to be converted into clock pulses which are counted from the position of a reference pulse T so as to determine the ignition timing and the timing of starting to supply current to the primary winding of the ignition coil by utilizing such time (clock) pulses. In such a case too, the uppermost instant and lowermost instant of ignition advance can be set by the fail-safe circuit 7.

Further, although a microprocessor is used in the ignition timing computing circuit 5 in the first embodiment of the present invention, a wired logic comprising a digital circuit and/or an analog circuit may be used in lieu of the microprocessor.

The aforementioned first and second embodiments of the present invention are designed so that ignition occurs at the lowermost instant of ignition advance when the result of arithmetic calculation by the ignition timing computing circuit 5 does not lie within the predetermined range of the ignition timing. However, the arrangement may be such that ignition occurs at the uppermost instant of ignition advance when the calculated instant lies on the advance side beyond the uppermost instant of ignition advance, and ignition occurs at the calculated instant when the calculated instant lies within the predetermined range of the ignition timing, while ignition occurs at the lowermost instant of ignition advance when the calculated instant lies on the retard side beyond the lowermost instant of ignition advance or when no signal indicative of the result of arithmetic calculation appears.

Figure 6:
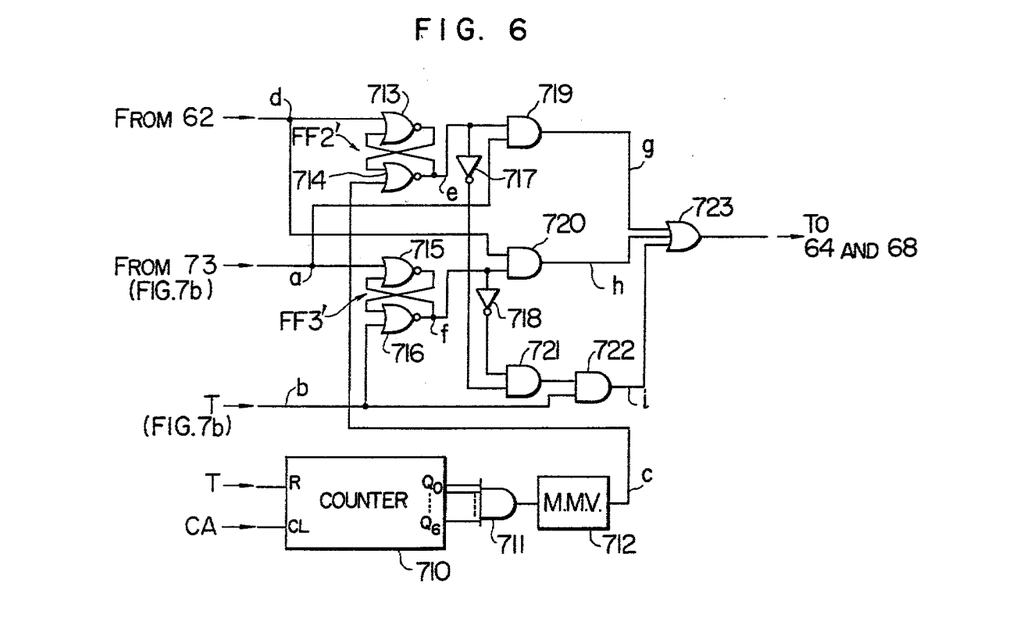
FIG. 6 is an electrical circuit diagram of part of a third embodiment of the present invention.

FIG. 6 shows a third embodiment of the present invention comprising another form of the fail-safe circuit 7 preferably used to satisfy the above requirement. The fail-safe circuit 7 shown in FIG. 6 is a modification of that shown in FIG. 2, and the difference from the fail-safe circuit 7 shown in FIG. 2 will only be described herein.

Figure 7:
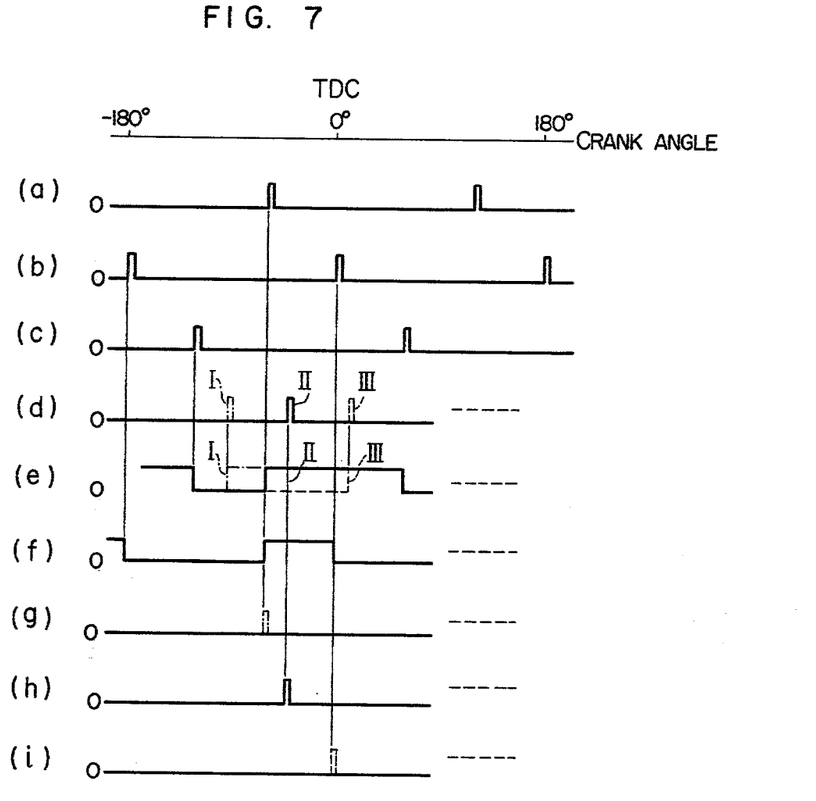
FIG. 7 shows waveforms appearing at various parts of the circuit shown in FIG. 6 to illustrate the operation of the circuit.

The structure and operation of this modified fail-safe circuit 7 will now be described with reference to FIGS. 6 and 7. Referring to FIG. 6, a part of the fail-safe circuit 7 shown in FIG. 2 is modified to include a counter 710, AND gates 711, 719, 720, 721 and 722, a monostable multivibrator 712, a pair of NOR gates 713 and 714 constituting a flip-flop FF2', another pair of NOR gates 715 and 716 constituting another flip-flop FF3', NOT gates 717 and 718, and an OR gate 723. The reference signal T determining the lowermost instant of ignition advance shown in FIG. 7(b) is applied together with the crank angle signal CA to the counter 710 which is connected through the AND gate 711 to the monostable multivibrator 712 which generates a pulse signal as shown in FIG. 7(c). It will be seen in FIG. 7(c) that each pulse of this pulse signal appears on the advance side of the uppermost instant of ignition advance determined by the uppermost instant signal, shown in FIG. 3(a), applied from the monostable multivibrator 73 shown in FIG. 2. The pulse signal shown in FIG. 7(c) is applied to the flip-flop FF2' as its reset input, and the reference signal or lowermost instant signal T shown in FIG. 7(b) is applied to the flip-flop FF3' as its reset input. The phase of the output signal of the comparator 62 (FIG. 2) defining the ignition timing arithmetically calculated in the ignition timing computing circuit 5, relative to the uppermost instant signal shown in FIG. 7(a) and the lowermost instant signal (the reference signal) shown in FIG. 7(b), is classified into the following three cases I, II and III shown in FIG. 7(d):

(I) The phase is advanced beyond the uppermost instant of ignition advance.

(II) The phase lies between the uppermost and lowermost instants of ignition advance.

(III) The phase is retarded beyond the lowermost instant of ignition advance.

In the case I shown in FIG. 7(d) in which the phase of the signal indicative of the result of arithmetic calculation is advanced beyond the uppermost instant of ignition advance, the NOR gate 714 provides an output signal as shown by the one-dot chain waveform in FIG. 7(e). It will be seen in FIG. 7(e) that such an output signal falls at the rise time of the output signal of the monostable multivibrator 712 and rises at the rise time of the signal I indicative of the result of arithmetic calcuculation. Therefore, the output signal of the NOR gate 714 is in its "1" level at the instant of appearance of the pulse of the uppermost instant signal, and an output signal as shown by the one-dot chain waveform in FIG. 7(g) appears from the AND gate 719. At this time, no pulse appears from the AND gate 720, since the NOR gate 716 provides an output signal as shown in FIG. 7(f) in which it will be seen that such an output signal falls at the rise time of the lowermost instant signal and rises at the rise time of the uppermost instant signal. The output signal of the NOR gate 714 is inverted by the NOT gate 717, and the output signal of the NOR gate 716 is inverted by the NOT gate 718. The output signals of these NOT gates 717 and 718 are applied to the AND gate 721, and the output signal of this AND gate 721 is applied to the AND gate 722 to which the lowermost instant signal is connected. However, no pulse appears from this AND gate 722 since the lowermost instant signal is not present at this time. Consequently, the AND gate 719 provides an output signal as shown by the one-dot chain waveform in FIG. 7(g), that is, the uppermost instant signal, and this signal appears at the output of the OR gate 723.

Similarly, in the case II, no pulses appear from the AND gates 719 and 722 as seen in FIGS. 7(g) and 7(i) respectively in which no solid waveforms are shown. In this case, the output signal of the AND gate 720, shown by the solid waveform in FIG. 7(h), that is, the signal indicative of the result of arithmetic calculation in the ignition timing computing circuit 5, appears at the output of the OR gate 723.

In the case III in which the phase of the signal indicative of the result of arithmetic calculation is retarded beyond the lowermost instant of ignition advance, or when no signal indicative of the result of arithmetic calculation appears, no pulses appear from the AND gates 719 and 720, and the output signal of the AND gate 722, shown by the broken waveform in FIG. 7(i), that is, the lowermost instant signal, appears at the output of the OR gate 723.

The structure shown in FIG. 6 may also be applied to the fail-safe circuit 7 shown in FIG. 4. In such an application, the output signal of the comparator 7b in FIG. 4 may be applied to the NOR gate 715 and to the AND gate 719 in FIG. 6 as the uppermost instant signal in lieu of the output signal of the monostable multivibrator 73 in FIG. 2, and the output signal of the comparator 7e in FIG. 4 may be applied to the NOR gate 716 and to the AND gate 722 in FIG. 6 as the lowermost instant signal in lieu of the reference signal T.

In each of the aforementioned embodiments of the present invention, the fail-safe circuit 7 is merely additionally provided as the fail-safe means for the output circuit 6 applying its output to the ignition device 8. Therefore, the ignition timing can be reliably limited to within the predetermined range by merely additionally providing the fail-safe circuit 7 without in any way altering the structure of the ignition timing computing circuit 5 and output circuit 6.

Although all of the aforementioned embodiments of the present invention are constructed to limit the ignition timing signal to within the predetermined range by the action of the fail-safe circuit 7, the effect similar to that described hereinabefore can also be obtained by limiting the data indicative of the result of arithmetic calculation to within a predetermined range.

Figure 8:
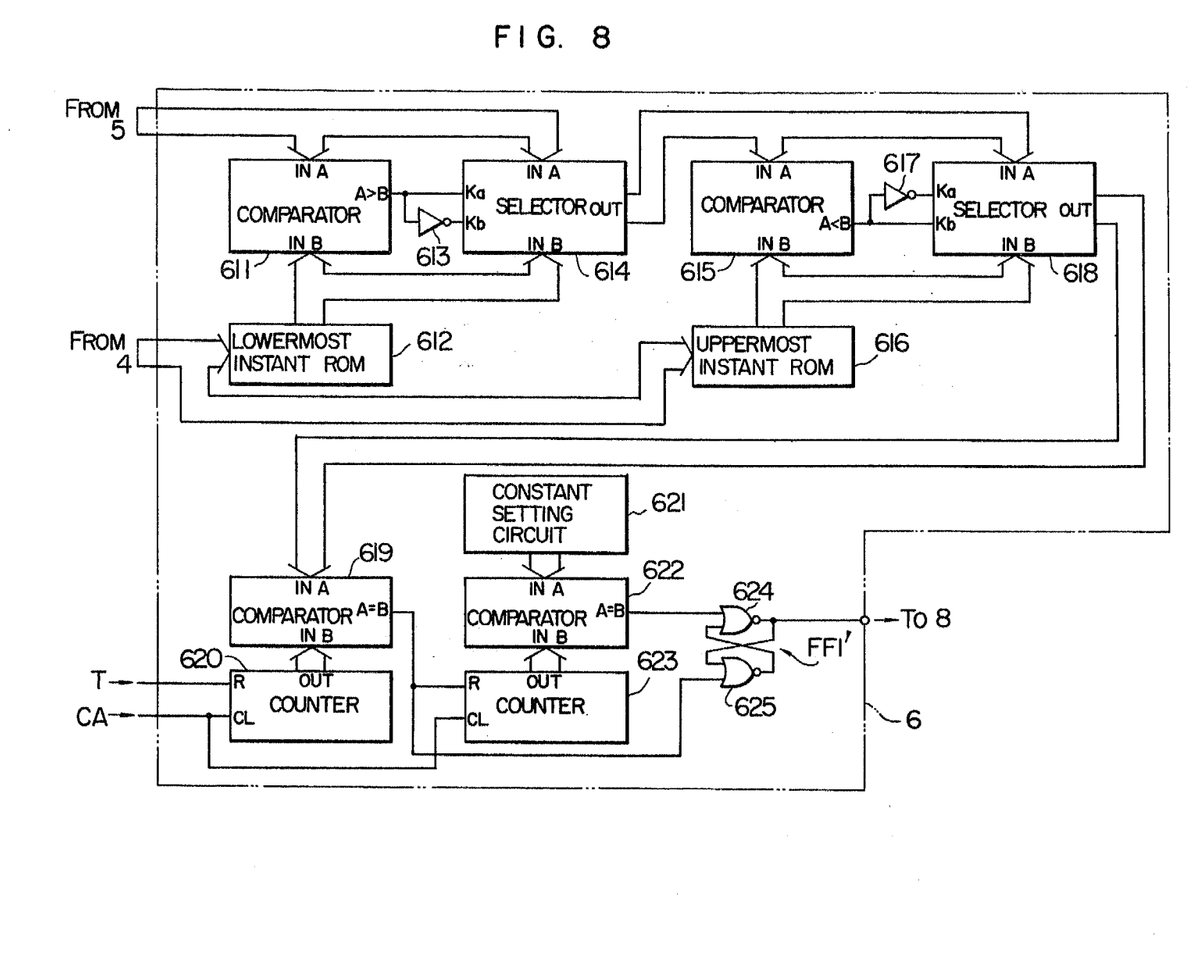
FIG. 8 is an electrical circuit diagram of part of a fourth embodiment of the present invention.

FIG. 8 shows a fourth embodiment of the present invention constructed to satisfy the above requirement. This fourth embodiment is actually a modification of the ignition timing control system shown in FIG. 1 in that the fail-safe circuit 7 is eliminated, and the output circuit 6 comprises means for limiting the data indicative of the result of arithmetic calculation. The output circuit 6 has a structure as shown in FIG. 8 and comprises data comparators 611, 615, 619 and 622, memory elements (ROM's) 612 and 616, NOT gates 613 and 617, data selectors 614 and 618, counters 620 and 623, a constant setting circuit 621, and a pair of NOR gates 624 and 625 constituting a flip-flop FF1', all of which are well known in the art.

Referring to FIG. 8, the ROM's 612 and 616 store pre-set or programmed data corresponding to the rotational speed of the engine, for example, data of a lowermost instant L and an uppermost instant U respectively of ignition advance variable depending on the rotational speed of the engine as shown in FIG. 5. A data signal indicative of the data of the detected rotational speed of the engine is applied to the ROM's 612 and 616 from the input circuit 4, and data signals indicative of the data of the pre-set lowermost and uppermost instants L and U of ignition advance corresponding to the detected rotational speed of the engine are applied from the ROM's 612 and 616 to the comparators 611, 615 and to the data selectors 614, 618 respectively. A data signal indicative of the data $\theta$ of the result of arithmetic calculation in the ignition timing computing circuit 5 is applied to the comparator 611 and to the data selector 614. The comparator 611 compares the data $\theta$ of the result of arithmetic calculation with the data of the lowermost instant L of ignition advance supplied from the ROM 612, and the larger one of these data is selected by the data selector 614. This data signal is applied from the data selector 614 to the comparator 615 and to the data selector 618. The comparator 615 compares the data $\theta$ or L supplied from the data selector 614 with the data of the uppermost instant U of ignition advance supplied from the ROM 616, and the smaller one of these data is selected by the data selector 618. Thus, the data signal indicative of the data of the lowermost instant L of ignition advance appears at the output of the data selector 618 when the data $\theta$ of the result of arithmetic calculation is smaller than the data of the lowermost instant L of ignition advance. On the other hand, when the data $\theta$ of the result of arithmetic calculation is larger than the data of the uppermost instant U of ignition advance, the data signal indicative of the data of the uppermost instant U of ignition advance appears at the output of the data selector 618, while when the data $\theta$ of the result of arithmetic calculation lies between the data of the lowermost and uppermost instants L and U of ignition advance, the data signal indicative of the data $\theta$ of the result of arithmetic calculation appears at the output of the data selector 618. The output signal of the data selector 618 is applied to the comparator 619. The counter 620 starts to count pulses of the crank angle signal CA after it is reset or cleared by a pulse of the reference signal T, and its count is compared in the comparator 619 with the data output of the data selector 618. When coincidence is reached between the two inputs, a pulse appears at the output of the comparator 619 so that ignition should occur at that instant. In response to the appearance of this signal, the combination of the counter 623, the comparator 622 and the constant setting circuit 621 determines the timing or instant of starting to supply current to the primary winding of the ignition coil, as shown in FIG. 3(h). The output signals of the comparators 619 and 622 are applied to the flip-flop FF1' composed of the NOR gates 624 and 625, so that this flip-flop FF1' generates an output pulse signal having a pulse width as shown in FIG. 3(i). It will thus be understood that the data θ of the result of arithmetic calculation is compared with the data of the lowermost and uppermost instants L and U of ignition advance in the output circuit 6, and this embodiment is also effective in limiting the ignition timing to within the predetermined range.

What is claimed is:

1. An ignition timing control system for internal combustion engines comprising:

means for detecting operating conditions of an internal combustion engine;

means for calculating an instant of ignition spark supplied to said internal combustion engine;

means for establishing an allowable uppermost and lowermost instants of ignition spark;

means for discriminating whether the calculated instant of ignition spark is inside or outside the allowable uppermost and lowermost instants of ignition spark; and means for generating an ignition spark at the calculated instant when the discrimination result indicates that the calculated instant is inside the allowable uppermost and lowermost instants and at a predetermined instant when the discrimination result indicates that the calculated instant is outside the allowable uppermost and lowermost instants, said predetermined instant being identical with either one of the allowable uppermost and lowermost instants.

2. An ignition timing control system according to claim 1, wherein said detecting means includes means for detecting rotational speed of said internal combustion engine, and wherein said establishing means includes means for storing therein the allowable uppermost and lowermost instants in relation to the detected rotational speed.

* * * * *